(12) United States Patent
Dong et al.

(10) Patent No.: US 12,135,079 B2
(45) Date of Patent: Nov. 5, 2024

(54) GEARSHIFT OVERLAP CONTROL SYSTEM AND CONTROL METHOD FOR IMPROVING VEHICLE DYNAMIC RESPONSE

(71) Applicant: BEIHANG UNIVERSITY, Beijing (CN)

(72) Inventors: Peng Dong, Beijing (CN); Junqing Li, Beijing (CN); Xiangyang Xu, Beijing (CN); Shuhan Wang, Beijing (CN); Yanfang Liu, Beijing (CN); Wei Guo, Beijing (CN)

(73) Assignee: BEIHANG UNIVERSITY

( * ) Notice: Subject to any disclaimer, the term of this patent is extended or adjusted under 35 U.S.C. 154(b) by 0 days.

(21) Appl. No.: 18/440,656

(22) Filed: Feb. 13, 2024

(65) Prior Publication Data
US 2024/0288066 A1    Aug. 29, 2024

(51) Int. Cl.
   *F16H 61/04*   (2006.01)
   *G06N 20/00*   (2019.01)

(52) U.S. Cl.
   CPC ......... *F16H 61/0437* (2013.01); *G06N 20/00* (2019.01); *F16H 2061/0459* (2013.01)

(58) Field of Classification Search
   CPC .............. F16H 61/0437; F16H 2061/0459
   See application file for complete search history.

(56) References Cited

U.S. PATENT DOCUMENTS

| 6,368,249 | B1* | 4/2002 | Hubbard | F16H 61/0437 |
|  |  |  |  | 477/121 |
| 8,308,611 | B2 | 11/2012 | Rangaraju et al. | |
| 8,323,150 | B2 | 12/2012 | Atmaram et al. | |
| 2003/0010104 | A1* | 1/2003 | Jeon | F16H 61/0437 |
|  |  |  |  | 73/115.02 |
| 2011/0263383 | A1* | 10/2011 | Ostberg | F16H 61/688 |
|  |  |  |  | 477/174 |

* cited by examiner

*Primary Examiner* — Edwin A Young
(74) *Attorney, Agent, or Firm* — Jose Cherson Weissbrot

(57) ABSTRACT

A gearshift overlap control system and a control method for improving vehicle dynamic response includes a gearshift progress calculation module: the gearshift progress calculation module is capable of calculating a gearshift progress in real time; a clutch control module: the clutch control module is capable of executing a first power-on downshift control and starting to perform a second power-on downshift control when a set second power-on downshift in a corresponding gearshift progress is requested; and an iterative learning control module: the iterative learning control module is capable of automatically adjusting a first on-coming clutch control pressure and a first off-going clutch control pressure in the first power-on downshift by means of monitoring the overshoot of the gearshift progress.

2 Claims, 9 Drawing Sheets

GEARSHIFT OVERLAP CONTROL SYSTEM AND CONTROL METHOD FOR IMPROVING VEHICLE DYNAMIC RESPONSE

TECHNICAL FIELD

This invention generally relates to the technical field of automatic transmission control, and more particularly, to a gearshift control method for improving vehicle dynamic response (specifically, a gearshift overlap control system and a control method for improving vehicle dynamic response).

BACKGROUND

For a vehicle equipped with an automatic transmission, a power-on downshift may be triggered when the driver steps on the accelerator pedal to accelerate the vehicle. A second power-on downshift may be triggered if the driver then further depresses the accelerator pedal during the downshift to increase acceleration. Namely, when the driver quickly and significantly steps on the accelerator pedal to accelerate the vehicle, a consecutive power-on downshift may be triggered.

Presently, gearshift control systems and methods for sequential shift control have been developed to execute consecutive power-on downshifts, wherein a first power-on downshift is executed first and a second power-on downshift is executed until the first power-on downshift is completed. However, the aforesaid technical solution may prolong the gearshift duration, which is detrimental to the driver's perception of acceleration response. To shorten the duration of performing consecutive power-on downshifts, U.S. Pat. No. 8,308,611B2 discloses a control system and method for performing a skip gearshift through a neutral gear. When the transmission control system receives a command to perform consecutive power-on downshifts, two off-going clutches are quickly released, thereby allowing the automatic transmission to temporarily stay at the neutral gear. However, a skip gearshift through a neutral gear may result in an undesirable feeling of neutral gearshift. U.S. Pat. No. 8,323,150B2 discloses a fast synchronous skip gearshift control system and method, wherein the speed regulation of the second power-on downshift begins at the synchronous moment of the first power-on downshift. Although this technology avoids a delay between two consecutive power-on downshifts and the feeling of neutral gearshift caused by skipping through the neutral gear, the reduction in gearshift duration and the improvement in vehicle dynamic response are limited. The paper (Multi-objective Parameter Optimization of Control Profiles for Automatic Transmission Double-transition Shifts) proposes an optimization method for performing consecutive power-on downshifts, wherein four controlled clutches participating in consecutive power-on downshifts are simultaneously controlled in a single gearshift event. Through adopting this optimization method, the control pressure trajectories of the four clutches are obtained. However, the technology needs to re-calibrate the control parameters of the four controlled clutches for real vehicle application, which requires a huge amount of calibration work. Meanwhile, the components of the automatic transmission are aged over time and the automatic transmissions are differentiated among the batch products, thereby causing inconsistency and low robustness of shift quality within the lifespan of the automatic transmission and among the batch products. However, U.S. Pat. Nos. 8,308,611, 8,323,150B2 and thesis ((Multi-objective Parameter Optimization of Control Profiles for Automatic Transmission Double-transition Shifts) do not consider these factors.

SUMMARY

The purpose of the present invention is to provide a gearshift overlap control system and a control method for improving vehicle dynamic response. More specifically, taking into account the requirements including a driver's quickly stepping on the accelerator pedal to accelerate the vehicle, the fast gearshift response and high gearshift comfort, the present invention provides a gearshift overlap control system and a control method for improving vehicle dynamic response. The control system and the control method control the overlap gearshift based on iterative learning.

To achieve the above purpose, the present invention adopts the following technical solution: a gearshift overlap control system for improving vehicle dynamic response performs a gearshift overlap control based on iterative learning; the control system comprises a gearshift progress calculation module, a clutch control module and an iterative learning control module; specifically, the control system comprising:

A gearshift progress calculation module: the gearshift progress calculation module is capable of calculating the gearshift progress in real time;

A clutch control module: the clutch control module executes clutch control of the first power-on downshift, and starts to control the second power-on downshift clutch when the gearshift progress reaches the preset gearshift progress when the second power-on downshift is requested;

An iterative learning control module: the iterative learning control module is capable of automatically adjusting the first on-coming clutch control pressure and the first off-going clutch control pressure in the first power-on downshift by means of monitoring the overshoot of the gearshift progress, thereby reducing the overshoot of the gearshift progress.

Preferably, in the gearshift progress calculation module, the calculation method of the gearshift progress is as follows:

$$\eta = 100\% \cdot \frac{(i_c - i)}{(i_c - i_t)} \quad (1)$$

wherein $\eta$ represents the gearshift progress, $i_c$ represents the speed ratio of a current gear, $i_t$ represents the speed ratio of a target gear, and $i$ represents the ratio of transmission input shaft speed to output shaft speed, calculated as:

$$i = \frac{\omega_1}{\omega_2} \quad (2)$$

wherein $\omega_1$ represents the transmission input shaft speed, and $\omega_2$ represents the transmission output shaft speed, wherein based on the gearshift progress, defining a gearshift overlap factor $\gamma$:

$$\gamma = 100\% - \eta_s \quad (3)$$

wherein $\eta_s$ represents the preset gearshift progress when the second power-on downshift is requested.

Preferably, in the clutch control module, during the execution of the first power-on downshift, the second power-on downshift is performed based on the preset gearshift progress when the second power-on downshift is triggered, wherein the first power-on downshift process comprises a first filling phase, a first inertia phase and a first torque phase, and the second power-on downshift process comprises a second filling phase, a second inertia phase and a second torque phase.

Preferably, in the first filling phase, the clutch control module controls the first off-going clutch pressure to be the minimum pressure at which the first off-going clutch does not slip, and the clutch control module controls the first on-coming clutch pressure to reach the first on-coming clutch KP point, wherein the KP point represents a critical oil pressure that the clutches are engaged but do not transmit torque;

Meanwhile, in first inertia phase, the gearshift progress starts to increase from 0; when the gearshift progress does not reach $\eta_s$, the clutch control module controls the first off-going clutch based on the feedforward controller and the feedback controller calibrated in a single power-on downshift, and the clutch control module maintains the first on-coming clutch pressure at the first on-coming clutch KP point; when the gearshift progress reaches $\eta_s$, the second inertia phase is triggered, resulting in a failure of the feedback controller based on the rotation speed; subsequently, the clutch control module controls the first off-going clutch based on the feedforward controller calibrated in a single power-on downshift, and the clutch control module maintains the first on-coming clutch pressure at the first on-coming clutch KP point; when the first inertia phase reaches the calibrated time of the first inertia phase, the first inertia phase ends;

In the first torque phase, the clutch control module controls the first off-going clutch and the first on-coming clutch based on the feedforward controller calibrated in a single power-on downshift.

Preferably, in the second filling phase, when the gearshift progress does not reach $\eta_s$, the clutch control module controls the second off-going clutch pressure to reduce to the minimum oil pressure such that the second off-going clutch does not slip, and the clutch control module controls the second on-coming clutch pressure to reach the second on-coming clutch KP point;

In the second inertia phase, and the clutch control module controls the second off-going clutch based on the feedforward controller calibrated in a single power-on downshift, and the clutch control module maintains the second on-coming clutch pressure at the second on-coming clutch KP point;

In the second torque phase, the clutch control module controls the second off-going clutch and the second on-coming clutch based on the feedforward controller calibrated in a single power-on downshift.

Preferably, in the iterative learning control module, the learning control parameters of the first off-going clutch and the first on-coming clutch are calculated according to the monitored overshoot of the gearshift progress, which is specifically as follows:

$$\begin{cases} \Delta P_{OG}^{j+1} = \Delta P_{OG}^j + q_{OG}^j \\ \Delta t_{OC}^{j+1} + = \Delta t_{OC}^j + q_{OC}^j \end{cases} \quad (4)$$

wherein $\Delta P_{OG}^{j+1}$ represents an iterative learning control parameter of the first off-going clutch under the j+1$^{th}$ overlap downshift, $\Delta t_{OC}^{j+1}$ represents an iterative control parameter of the first on-coming clutch under the j+1$^{th}$ overlap downshift, $\Delta P_{OG}^j$ represents an iterative learning control parameter of the first off-going clutch under the j$^{th}$ overlap downshift, $\Delta t_{OC}^j$ represents an iterative control parameter of the first on-coming clutch under the j$^{th}$ overlap downshift, and $q_{OG}^j$ and $q_{OC}^j$ respectively represent an iterative learning control step length of the first off-going clutch under the j$^{th}$ overlap downshift and an iterative learning control step length of the first on-coming clutch under the j$^{th}$ overlap downshift.

Preferably, in the iterative learning control module, the specific process of the iterative learning control, comprising:

Step 1: referring to FIG. 10, calculating the gearshift progress overshoot $\Delta \eta^j$ in the current gearshift process, wherein the iterative learning control module calculates and stores $\eta^j(t_c)$ and $\eta^j(t_m)$ in real time, and the gearshift progress overshoot is defined as the maximum value of the difference between $\eta^j(t_m)$ and $\eta^j(t_c)$:

$$\Delta \eta^j = \max(\eta^j(t_m) - \eta^j(t_c)), t_m \in (t_s, t_c], t_c \in (t_s, t_f] \quad (5)$$

wherein $\eta^j(t_c)$ represents the value of the gearshift progress corresponding to the current moment $t_c$, $\eta^j(t_m)$ represents the maximum value of the gearshift progress between the moment $t_s$ and the moment $t_c$, $t_s$ represents the moment when the second inertia phase is initiated, $t_c$ represents the current moment, $t_m$ represents the moment corresponding to $\eta^j(t_m)$, and $t_f$ represents the moment when the second inertia phase ends;

Step 2: determining whether the gearshift progress overshoot $\Delta \eta^j$ is greater than the predetermined critical value by 5%;

Step 3: if so, calculating the clutch iterative learning control step length according to formula (6); and if not, calculating the clutch iterative learning control step length according to formula (7);

$$\begin{cases} q_{OC}^j = L_{OG}(\Delta \eta^j) \\ q_{OC}^j = L_{OC}(\Delta \eta^j) \end{cases} \quad (6)$$

$$\begin{cases} q_{OC}^j = 0 \\ q_{OG}^j = 0 \end{cases} \quad (7)$$

wherein $L_{OG}(\Delta \eta^j)$ and $L_{OC}(\Delta \eta^j)$ respectively represent an iterative learning control step length of the first off-going clutch and an iterative learning control step length of the first on-coming clutch obtained according to the gearshift progress overshoot of the j$^{th}$ overlap downshift by using a look-up table method;

Step 4: calculating the iterative learning control parameters $\Delta P_{OG}^{j+1}$ and $\Delta t_{OC}^{j+1}$ of the first off-going clutch and the first on-coming clutch according to formula (8);

$$\begin{cases} \Delta P_{OG}^{j+1} = \Delta P_{OG}^j + q_{OG}^j \\ \Delta t_{OC}^{j+1} = \Delta t_{OC}^j + q_{OC}^j \end{cases} \quad (8)$$

Step 5: storing the iterative learning control parameters $\Delta P_{OG}^{j+1}$ and $\Delta t_{OC}^{j+1}$ of the first off-going clutch and the first on-coming clutch;

Step 6: performing the j+1$^{th}$ overlap downshift of the vehicle in the same working condition;

Step 7: applying the clutch iterative learning control parameters $\Delta P_{OG}^{j+1}$ and $\Delta t_{OC}^{j+1}$ on the basic clutch control parameters of the first power-on downshift.

A gearshift overlap control method for improving vehicle dynamic response, wherein the control method achieves a gearshift overlap control based on iterative learning. More specifically, the gearshift overlap control method for improving vehicle dynamic response, comprising the steps of:

Step 1: determining a gearshift progress of the first power-on downshift when the second power-on downshift is requested by the gearshift progress calculation module;

Step 2: completing the first power-on downshift and starting to control the second power-on downshift clutch when the preset gearshift progress is reached and a second power-on downshift is requested;

Step 3: calculating an iterative learning control parameter of the first on-coming clutch and an iterative learning control parameter of the first off-going clutch by monitoring the overshoot of the gearshift progress, and automatically adjusting the first on-coming clutch control parameter and the first off-going clutch control parameter of the first power-on downshift when the gearshift overlap control is triggered in the same working condition in next time by the iterative learning control module, thereby reducing the overshoot of the gearshift progress.

Compared with the prior art, the present invention has the following advantages:

1) By overlapping two clutch-to-clutch power-on downshifts, the prior technical problem relating to a long gearshift duration caused by sequentially performing downshifts is solved such that the gearshift dynamic response is significantly improved; because the control parameters of the clutch-to-clutch power-on downshifts have been calibrated in the control strategy of a single downshift, the calibration workload is effectively reduced by overlapping two clutch power-on downshifts; in this way, the prior technical problem relating to the large calibration amount of the control parameters of the four controlled clutches is solved;

2) The gearshift comfort is significantly improved by using the control method based on iterative learning; in the overlap region of the two power-on downshifts, due to the limited sensors, in a single clutch-to-clutch gearshift, the closed-loop control based on the rotation speed is no longer applicable; through monitoring the gearshift quality by iterative learning, the automatic adjustment of the clutch control parameters is achieved; therefore, the robustness of control is enhanced, the gearshift quality is improved, and high consistency of gearshift quality during the lifespan of the automatic transmission is realized;

3) The gearshift overlap control system and control method of the present invention overcomes shortcomings relating to long gearshift duration, large workload of calibration and poor robustness, so that the consecutive downshift response of the transmission is improved and the dynamic properties of the vehicle are improved;

4) Based on a single power-on downshift that has been calibrated, using the gearshift overlap control system and control method is capable of solving the technical problem relating to the long gearshift duration caused by sequentially performing downshifts; moreover, the workload of calibration of the control parameters of four controlled clutches is effectively reduced;

5) The iterative learning control of the present invention automatically adjusts the control parameters of the first off-going switch and the first on-coming switch by monitoring the gearshift progress overshoot representing the gearshift quality, thereby significantly improving the comfort of overlap gearshift.

6) The gearshift control algorithm of the present invention has few calibration parameters, and the control strategy is simple, achieving easy engineering implementation.

BRIEF DESCRIPTION OF THE DRAWINGS

To more clearly illustrate the embodiments of the present invention or the technical solutions in the prior art, the drawings that need to be used in the embodiments are briefly described below. The drawings allow the features and benefits of the present invention to be clearly understood. The drawings are illustrative and should not be construed as any limitation to the present invention. For those skilled in the art, other drawings may be obtained based on the drawings of the present invention without paying creative labor.

Figure 1:
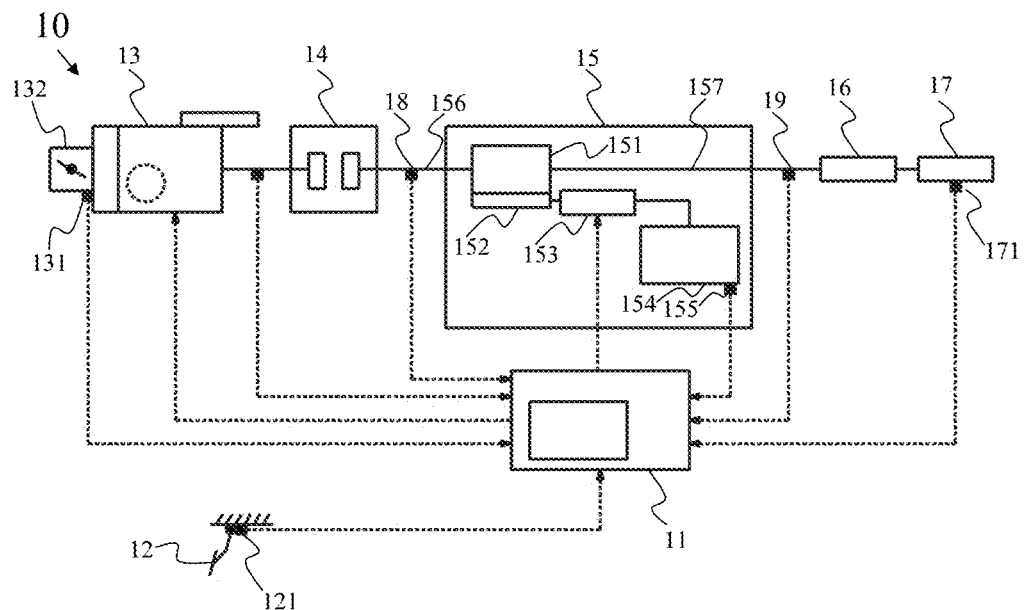
FIG. 1 is a functional diagram illustrating the vehicle system comprising the control module.

In FIGS. : 10—Dynamic System, 11—Control Module, 12—Accelerator Pedal, 13—Engine, 14—Hydraulic Torque Converter, 15—Automatic Transmission, 16—Driving System, 17—Driven Wheel, 18—Automatic Transmission Input Shaft Rotation Speed, 19—Automatic Transmission Output Shaft Rotation Speed, 110—Gearshift Control Module, 121—Accelerator Pedal Position Sensor, 131—Engine Rotation Speed Sensor, 132—Throttle Valve, 151—Gear System, 152—Friction Element, 153—Hydraulic Circuit, 154—Hydraulic Source, 155—Transmission Fluid Temperature Sensor, 156—Automatic Transmission Input Shaft, 157—Automatic Transmission Output Shaft, 171—Wheel Rotation Speed Sensor, 1101—Gearshift Type Determination Module, 1101—Gearshift Stage Determination Module, 1103—Clutch Control Module, 1104—Engine Torque Control Module, 1105—Timer, 1106—Non-dynamic Upshift Clutch Control Sub-module, 1107—Dynamic Upshift Clutch Control Sub-module, 1108—Non-power-on downshift Clutch Control Sub-module, 1109—Power-on downshift Clutch Control Sub-module 1110—Iterative Learning Control Module, 1111—Gearshift progress Calculation Module, 1511,1512,1513—Planetary Gear Sets, 1514,1515, 1516—Fixed-shaft Gear, 1517,1518,1519—Sun Gear, 1520, 1521,1522—Planet Carrier, 1523,1524,1525—Planetary Gear, 1526,1527,1528—Gear, 1529,1530,1531,1532, 1533—Clutch, 500,502,504,506,600,602,604,700,702,704, 706,801,802,803,804—Clutch Control Oil Pressure Signal, 510—Sensor Signal, 514—Moment 514, 516—Moment 516, 518—Moment 518, 520—Moment 520, 610—Moment 610, 612—Moment 612, 614—Moment 614, 710—Moment 710, 712—Moment 712, 714—Moment 714, 716—Moment 716, 805—Gearshift progress, 806—Automatic Transmission Input Shaft Rotation Speed, 807—Moment 807, 808—Moment 808, 809—Moment 809, 810—Moment 810, 811—Moment 811, 812—Moment 812, 813—Moment 813, 814—Moment 814.

DETAILED DESCRIPTION

To allow the purposes, features and benefits of the present invention to be better understood, a detailed description of the present invention is provided below in combination with the drawings and specific embodiments. It should be noted that the embodiments of the present invention and the features in the embodiments may be combined with each other without conflict.

In addition, to allow the details of the present invention to be better understood, the present invention may also be implemented in other ways different from those described herein. Therefore, the scope of the present invention is not limited by the specific embodiments described below.

The present invention provides a gearshift overlap control system for improving vehicle dynamic response. The control system performs a gearshift overlap control based on iterative learning, and the control system comprises a gearshift progress calculation module, a clutch control module and an iterative learning control module. More specifically, the technical solution of the present invention is as follows:

A gearshift progress calculation module: the gearshift progress calculation module is capable of calculating a gearshift progress in real time;

A clutch control module: the clutch control module is capable of completing a first power-on downshift control, and starts to control the second power-on downshift clutch when the gearshift progress reaches the preset gearshift progress when the second power-on downshift is requested;

An iterative learning control module: the iterative learning control module is capable of automatically adjusting a first on-coming clutch control pressure and a first off-going clutch control pressure in the first power-on downshift by means of monitoring the overshoot of the gearshift progress, thereby reducing the overshoot of the gearshift progress.

The present invention also provides a gearshift overlap control method for improving vehicle dynamic response. The control method of present invention achieves a gearshift overlap control based on iterative learning. More specifically, the gearshift overlap control method for improving vehicle dynamic response, comprising the steps of:

Step 1: determining a gearshift progress of the first power-on downshift when the second power-on downshift is requested by the gearshift progress calculation module;

Step 2: completing the first power-on downshift and starting to control the second power-on downshift clutch when the preset gearshift progress is reached and a second power-on downshift is requested;

Step 3: calculating an iterative learning control parameter of the first on-coming clutch and an iterative learning control parameter of the first off-going clutch by monitoring the overshoot of the gearshift progress, and automatically adjusting the first on-coming clutch control parameter and the first off-going clutch control parameter of the first power-on downshift when the gearshift overlap control is triggered in the same working condition in next time by the iterative learning control module, thereby reducing the overshoot of the gearshift progress;

Specifically, in the gearshift progress calculation module, the calculation method of the gearshift progress is as follows:

$$\eta = 100\% \cdot \frac{(i_c - i)}{(i_c - i_t)} \tag{1}$$

wherein $\eta$ represents the gearshift progress, $i_c$ represents the speed ratio of a current gear, $i_t$ represents the speed ratio of a target gear, and $i$ represents the ratio of the rotation speed of an input shaft to the rotation speed of an output shaft of a transmission:

$$i = \frac{\omega_1}{\omega_2} \tag{2}$$

wherein $\omega_1$ represents the transmission input shaft rotation speed, and $\omega_2$ represents the transmission output shaft rotation speed;

Based on the gearshift progress, defining a gearshift overlap factor $\gamma$:

$$\gamma = 100\% - \eta_s \tag{3}$$

wherein $\eta_s$ represents a preset gearshift progress when the second power-on downshift is requested; as can be seen from formula (3), the larger the overlap factor $\gamma$, the smaller the corresponding preset gearshift progress $\eta_s$ when the second power-on downshift is requested, and the earlier the second power-on downshift is requested; normally, the control system sets an overlap factor according to the requirement of an actual duration of gearshift, and then the control system inversely calculates the corresponding preset gearshift progress $\eta_s$ when the second power-on downshift is requested according to the preset overlap factor based on formula (3), namely, $\eta_s=100\%-\gamma$; for example, if the preset overlap factor is 30%, the control system requests the second power-on downshift when the gearshift progress is 70%;

In the clutch control module, after the first power-on downshift is completed, the second power-on downshift is performed based on the corresponding preset gearshift progress when the second power-on downshift is triggered. The first power-on downshift process comprises a first filling phase, a first inertia phase and a first torque phase, and the second power-on downshift process comprises a second filling phase, a second inertia phase and a second torque phase.

In the iterative learning control module, through monitoring the overshoot of the gearshift progress, an iterative learning control parameter of the first on-coming clutch and an iterative learning control parameter of the first off-going clutch are calculated, and when the gearshift overlap control is triggered in the same working condition in next time, the first on-coming clutch control parameter and the first off-going clutch control parameter of the first power-on downshift process are automatically adjusted, thereby reducing the overshoot of the gearshift progress.

FIG. 1 shows an exemplary vehicle system of the present invention. Referring to FIG. 1, the vehicle system comprises a dynamic system 10 controlled by a control module 11. The control module 11 receives the input information from an accelerator pedal 12 and a group of sensors for detecting the operating condition of the vehicle system. The dynamic system 10 comprises an engine 13, a torque converter 14, an automatic transmission 15, a driving system 16 and one or more driven wheels 17. The engine 13 generates a driving torque that is transmitted through the hydraulic torque converter 14 to the automatic transmission 15. The automatic transmission 15 transmits the driving torque to the driving system 16 according to the driving ratios under different gears, thereby propelling the driven wheels 17.

Figure 2:
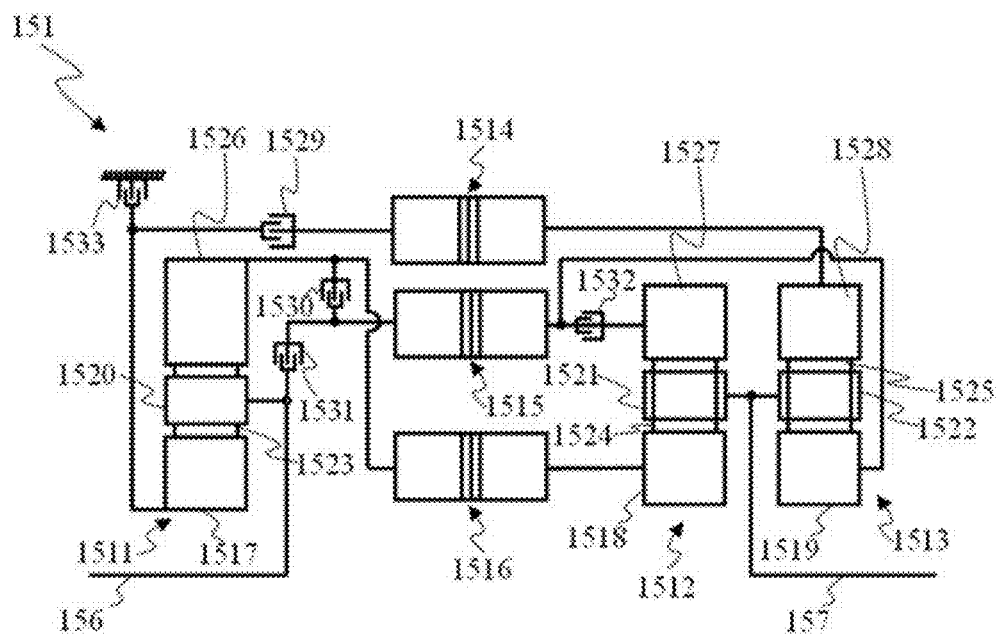
FIG. 2 is a partial schematic diagram illustrating the automatic transmission in FIG. 1.

Referring to FIG. 2, in one embodiment of the present invention, a gear system 151 in the automatic transmission 15 comprises three planetary gear sets 1511, 1512 and 1513 and three fixed-shaft gears 1514, 1515 and 1516. The planetary gear sets 1511, 1512 and 1513 further comprise corresponding sun gears 1517, 1518 and 1519, planet carriers 1520, 1521 and 1522, planet gears 1523, 1524 and 1525, and gear rings 1526, 1527 and 1528. Friction elements 152 comprise clutches 1529, 1530, 1531, 1532 and 1533 that are selectively engageable to provide eight forward gear ratios (1, 2, 3, 4, 5, 6, 7 and 8). 156 and 157 respectively represent the input shaft and the output shaft of the automatic transmission 15. Table 1 shows the state of engagement of the friction elements for each forward gear ratio.

TABLE 1

|   | 1529 | 1530 | 1531 | 1532 | 1533 |
|---|------|------|------|------|------|
| 1 | X    | X    |      |      | X    |
| 2 | X    |      |      | X    | X    |
| 3 |      | X    |      | X    | X    |
| 4 |      |      | X    | X    | X    |
| 5 |      | X    | X    |      | X    |
| 6 |      | X    | X    | X    |      |
| 7 | X    | X    | X    |      |      |
| 8 | X    |      | X    | X    |      |

In the above table, "X" indicates that the clutch is engaged for realizing the gear ratio under that shift. By separating one or more engaged clutches (these clutches are referred to as off-going clutches) while engaging one or more separate clutches (these clutches are referred to as on-coming clutches), shifting from one gear ratio to another is achieved.

The control module 11 controls the operation of the engine 13 and the automatic transmission 15 based on the driver's input information received by the accelerator pedal 12 and the detected information of the sensors detecting the operating condition of the vehicle system 10. The control module 11 comprises a gearshift control module 110 that controls the clutch control pressure for separating and engaging the clutches during a power-on downshift process (i.e., a downshift that occurs when the accelerator pedal 12 is pressed). The gearshift control module 110 controls the clutch control pressure by outputting a control signal indicating a desired clutch control pressure to the hydraulic circuit 153. As described in more detail below, the gearshift control module 110 controls the clutch control pressure based on operating conditions including the automatic transmission input shaft speed, the engine torque, the automatic transmission temperature and the vehicle speed, etc.

The input shaft rotation speed may be determined using a variety of methods. In one embodiment of the present invention, the automatic transmission input shaft ration speed sensor 18 is capable of measuring the rotation speed of the automatic transmission input shaft 156.

The transmission temperature is an estimated value of the temperature of the fluid within the clutch case. The transmission temperature may be determined using various methods. In one embodiment of the present invention, the transmission temperature may be determined based on the temperature of the fluid supplied by a hydraulic source 154. A transmission fluid temperature sensor 155 is capable of sensing the temperature of the fluid.

The vehicle speed is the linear speed of the vehicle system 10. The vehicle speed may be determined based on the rotation speed of the driven wheel 17. A wheel rotation speed sensor 171 is capable of measuring the rotation speed of the driven wheel 17.

The gearshift control module 110 also controls the clutch control pressure based on an accelerator pedal position sensor 121 and the automatic transmission input shaft rotation speed sensor 18.

When the accelerator pedal position sensor 121 indicates that the driver has stepped on the accelerator pedal 12, the gearshift control module 110 performs a power-on downshift. More specifically, when the driver starts stepping on the accelerator pedal 12, the gearshift control module 110 starts performing a first power-on downshift, and when the driver further steps on the accelerator pedal 12, the gearshift control module 110 starts performing a second power-on downshift. When this occurs, the gearshift control module 110 starts performing the second power-on downshift before the first power-on downshift is completed, thereby significantly shortening the duration of gearshift. The gearshift control module 110 starts a second power-on downshift when the first power-on downshift is synchronously performed or before the first power-on downshift is completed. In this way, the gearshift control module 110 performs the gearshift overlap control method of the present invention.

Figure 3:
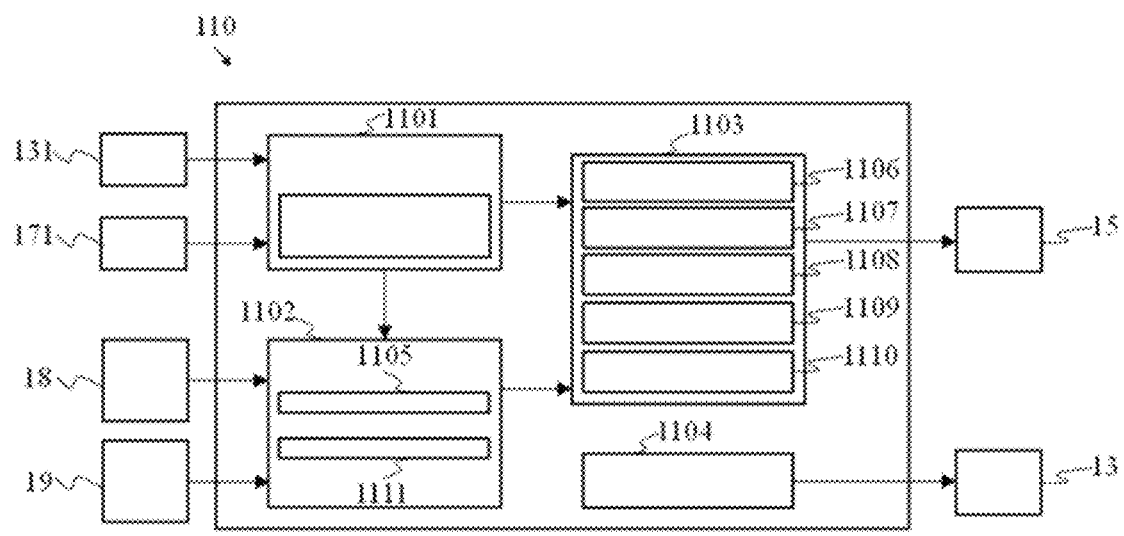
FIG. 3 is a functional diagram illustrating the control module in FIG. 1.

Referring to FIG. 3, the gearshift control module 110 comprises a gearshift type determination module 1101, a gearshift stage determination module 1102, a clutch control module 1103, and an engine torque control module 1104. The gearshift type determination module 1101 communicates with an engine rotation speed sensor 131 and the wheel rotation speed sensor 171, thereby determining a gearshift type based on the throttle position and the vehicle speed.

For example, downshift may be performed when a commanded gear ratio is greater than an obtained gear ratio. The downshift may be a power-on downshift, or a power-off downshift. When the accelerator pedal 12 is pressed and the throttle valve 132 is opened to accelerate the vehicle, a power-on downshift may occur, and when the accelerator pedal 12 is released to decelerate the vehicle, a power-off downshift may occur. When the commanded gear ratio is lower than the obtained gear ratio, an upshift may be performed. The upshift may be a power-on upshift or a power-off upshift. When the accelerator pedal 12 is pressed and the throttle valve 132 is opened, and the vehicle speed increases after the accelerator pedal 12 is pressed, there may be a power-on upshift, and when the vehicle speed increases and the accelerator pedal 12 is released, a power-on upshift may occur.

The gearshift stage determination module 1102 comprises a timer 1105 and a gearshift progress calculation module 1111. The timer 1105 is initiated at the beginning of a gearshift. The gearshift stage determination module 1102 determines the stage of the gearshift based on the gearshift duration measured by the timer 1105 and/or the automatic transmission input shaft rotation speed detected by the automatic transmission input shaft rotation speed sensor 18. The gearshift progress calculation module 1111 calculates the gearshift progress in real time based on the automatic transmission input shaft rotation speed detected by the automatic transmission input shaft rotation speed sensor 18 and the automatic transmission output shaft rotation speed detected by the automatic transmission output shaft rotation speed sensor 19.

The clutch control module 1103 may comprise a plurality of clutch control sub-modules corresponding to different gearshift types, and the clutch control sub-module further comprises a feedforward controller and a feedback controller that have been calibrated for controlling the clutches of a single gearshift (e.g., 8 to 4). For example, the clutch control module 1103 may comprise a power-off upshift clutch control sub-module 1106, a power-on upshift clutch control sub-module 1107, a power-off downshift clutch control sub-module 1108, a power-on downshift clutch control sub-module 1109, and an iterative learning control module 1110. The clutch control module 1103 selects the clutch control sub-module based on the gearshift type determined by the gearshift type determination module 1101. The selected clutch control sub-module controls the automatic transmission 15 to perform the gearshift. The manner in which the selected clutch control sub-module performs the gearshift depends on the gearshift stage and the gearshift progress received from the gearshift stage determination module 1102, which is described in more detail below.

Figure 4:
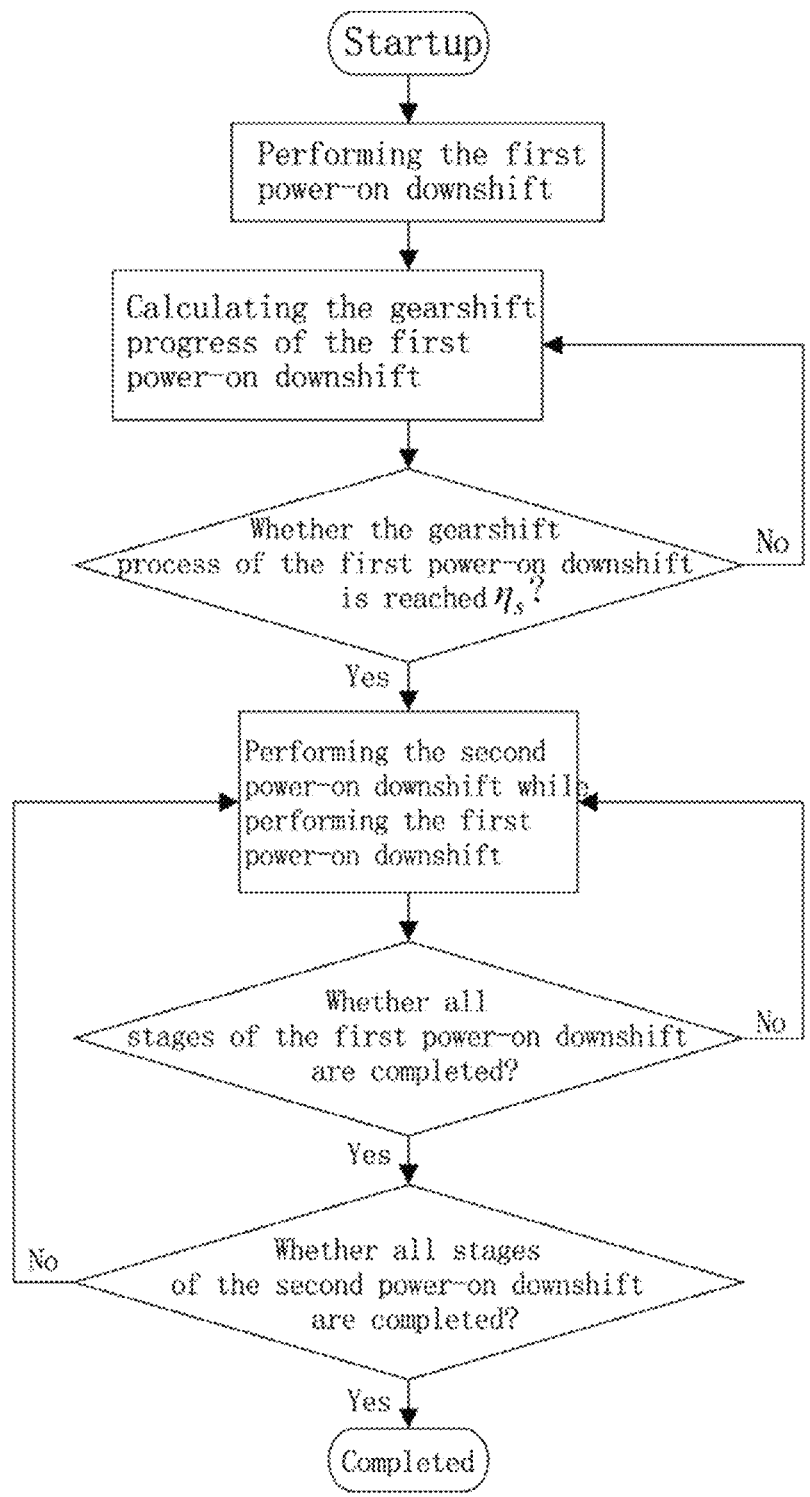
FIG. 4 is a flow chart illustrating the method for performing gearshift overlap control on the automatic transmission according to the principle of the present invention.

Referring to FIG. 4, when performing the first power-on downshift, and when the gearshift type determination module 1101 indicates that the second power-on downshift is requested, the clutch control module 1103 performs a gearshift overlap control. Referring again to FIG. 4, the clutch control module 1103 may perform a gearshift overlap control according to the following method. While performing the first power-on downshift, the clutch control module starts to control the second power-on downshift clutch when a gearshift progress reaches a corresponding preset gearshift process when the set second power-on downshift is requested. When each gearshift stage of the first power-on downshift and the second power-on downshift ends, the downshift overlap control is completed. The second power-on downshift is performed before or when the first power-on downshift is synchronously performed, thereby shortening the gearshift duration while improving the continuity of the gearshift such that the vehicle dynamic response is significantly improved.

Figure 5:
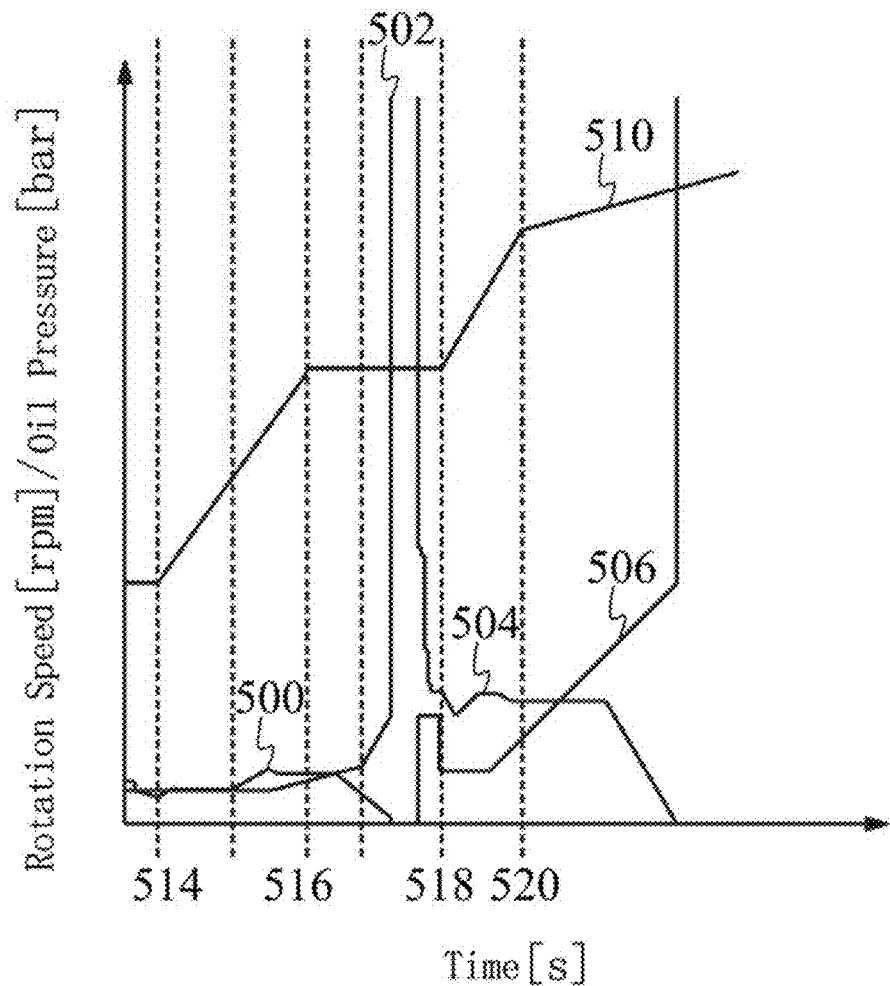
FIG. 5 is a schematic diagram illustrating a variation of control signals and sensor signals when performing a gearshift control on the automatic transmission according to the prior art.
Figure 6:
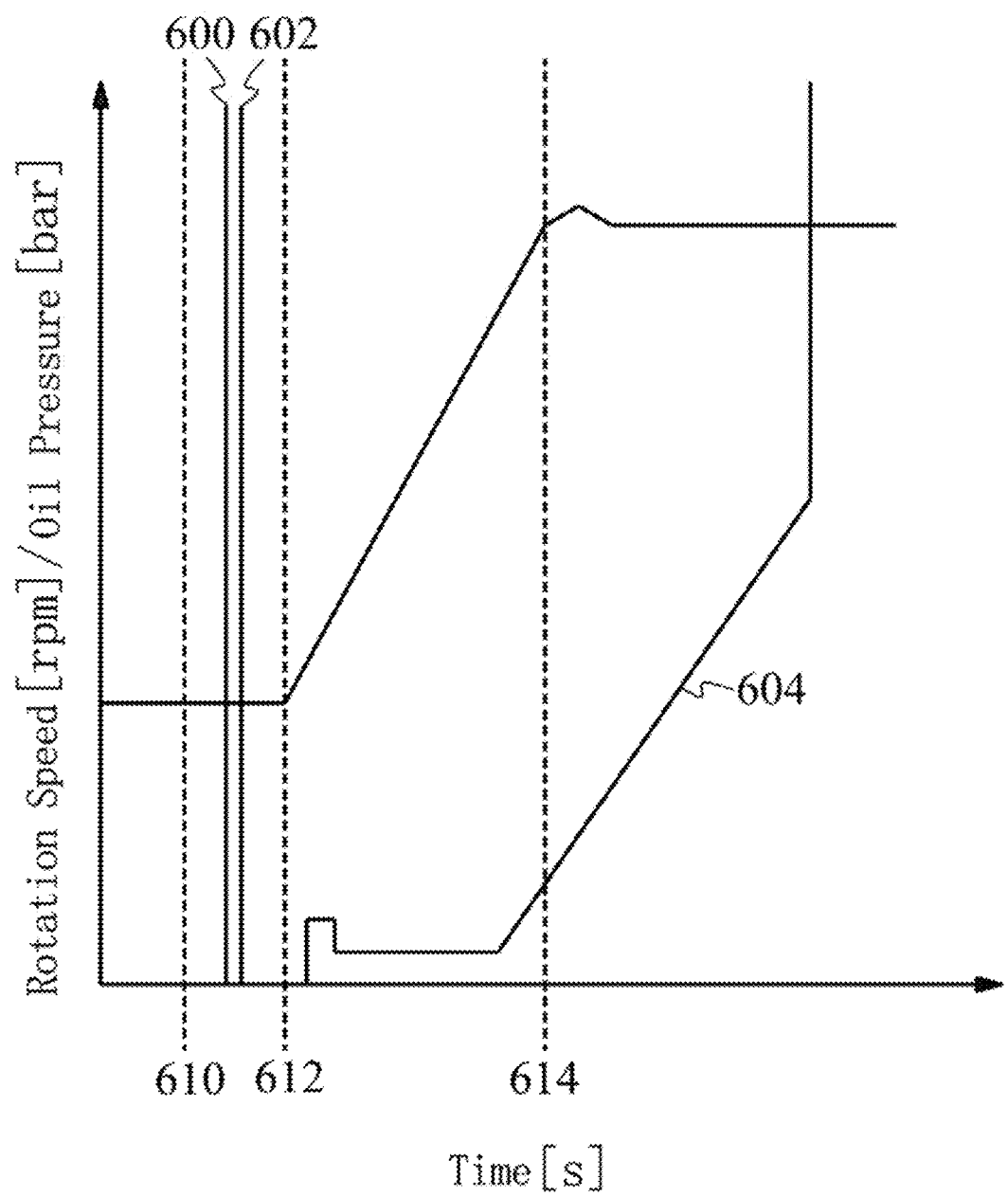
FIG. 6 is another schematic diagram illustrating a variation of control signals and sensor signals when performing a gearshift control on the automatic transmission according to the prior art.
Figure 7:
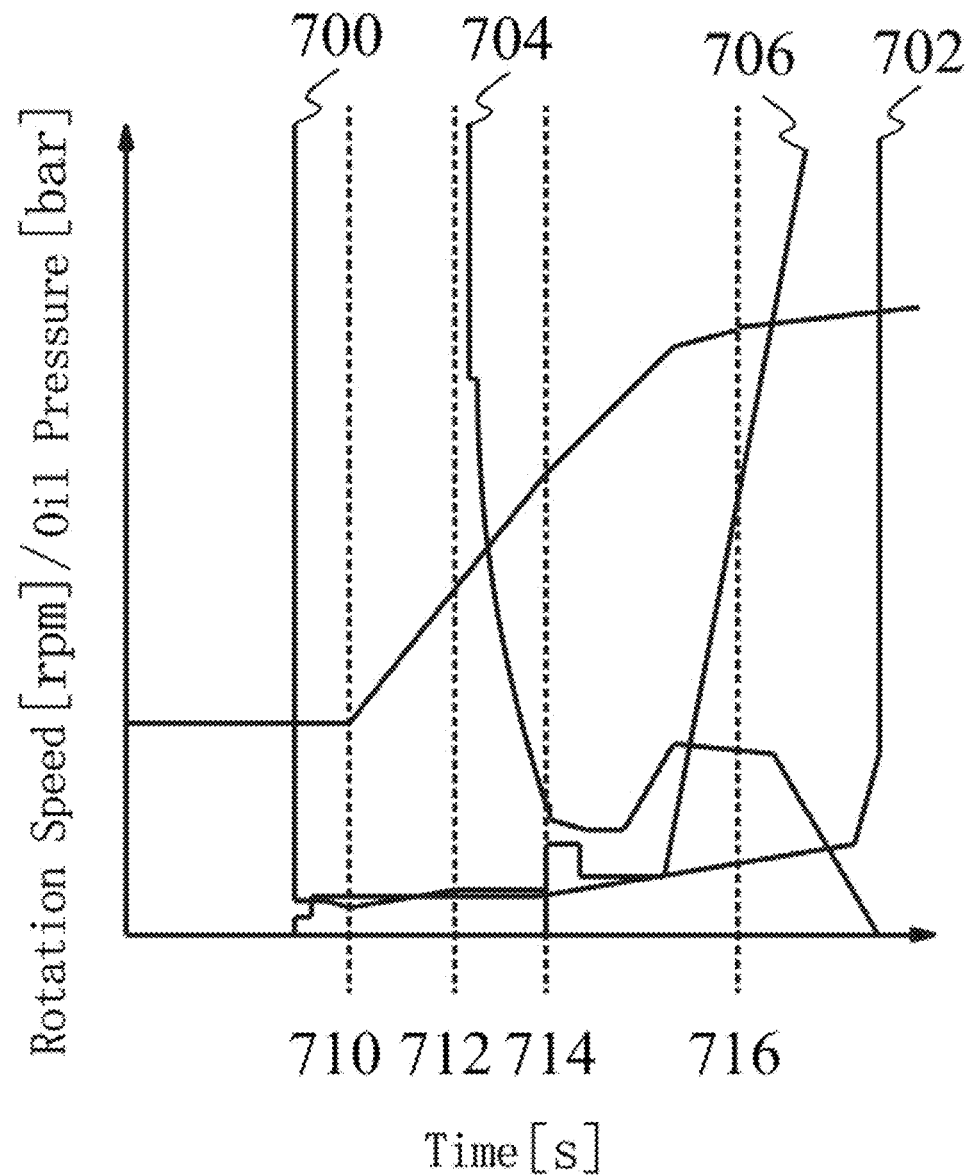
FIG. 7 is another schematic diagram illustrating a variation of control signals and sensor signals when performing a gearshift control on the automatic transmission according to the prior art.

Referring to FIGS. 5-7, the analysis of the prior art is as follows:

FIG. 5 shows a clutch control oil pressure signal and an automatic transmission input shaft ration speed signal that are relevant to the consecutive execution of two power-on downshifts, wherein the x-axis represents the time, the clutch control oil pressure signals 500 and 502 respectively represent the first off-going clutch and the first on-coming clutch, and the clutch control oil pressure signals 504 and 506 respectively represent the second off-going clutch and the second on-coming clutch. The sensor signal 510 indicates a measured automatic transmission input shaft rotation speed signal. Before the moment 514, the accelerator pedal position signal (not shown) indicates that the first power-on downshift is requested. At the moment 514, the first power-on downshift begins when the measured automatic transmission input shaft rotation speed starts to increase. At the moment 516, when the measured automatic transmission input shaft rotation speed increases to the automatic transmission input shaft rotation speed (not shown) estimated at the commanded gear ratio of the first power-on downshift, the first power-on downshift is completed at the first synchronized moment (e.g., the synchronized moment of first power-on downshift). After the first synchronized moment and after the moment 516, the first off-going clutch is completely released and the first on-coming clutch is fully applied. After the first on-coming clutch is fully applied and before the moment 518, the second off-going clutch begins to be released, and the second on-coming clutch begins to be applied. At the moment 518, the second gearshift begins when the measured automatic transmission input shaft rotation speed begins to increase. Therefore, there is a delay between the first gearshift and the second gearshift, which increases the duration required for the two gearshifts. Further, during this delay, the vehicle acceleration increases, resulting in a driver's perception of two significantly different gearshifts. At the moment 520, when the measured automatic transmission input shaft rotation speed increases to the automatic transmission input shaft rotation speed (not shown) estimated at the commanded gear ratio of the second power-on downshift, the second downshift is completed.

FIG. 6 shows clutch control oil pressure signals and automatic transmission input shaft rotation speed signals for a skip gearshift through a neutral gear. In this technical solution, the first and second off-going clutches, as well as the first and second on-coming clutches are simultaneously controlled during the entire gearshift progress. The clutch control oil pressure signals 600 and 602 control the first and second off-going clutches. The clutch control oil pressure signal 604 controls the first and second on-coming clutches. At the moment 610, the power-on downshift 8-3 is requested. At the moment 612, when the measured automatic transmission input shaft rotation speed begins to increase, the power-on downshift 8-3 starts. At the moment 614, the power-on downshift 8-3 is synchronously performed.

As shown in the above table and FIG. 2, the 8-3 gearshift of the automatic transmission needs to release two clutches (1529, 1531) and apply two clutches (1530, 1533). Therefore, the 8-3 gearshift is normally accompanied with two consecutive (taking 8-4 and 4-3 as examples) downshifts. Referring to FIG. 6, the skip gearshift through the neutral gear enables the automatic transmission to release and apply two clutches during a single gearshift. However, the skip gearshift through a neutral gear may also result in an undesirable feeling of neutral gearshift.

FIG. 7 shows clutch control oil pressure signals and automatic transmission input shaft rotation speed signals used for a fast synchronous skip gearshift control. The clutch control oil pressure signal 700 controls the first off-going clutch of the first power-on downshift (8-4). The clutch control oil pressure signal 702 controls the first on-coming clutch of the first power-on downshift (8-4), and the first on-coming clutch transitions to a second hold clutch of the second power-on downshift (4-3). The clutch control oil pressure signal 704 controls the first hold clutch of the first power-on downshift (8-4), and the first hold clutch transitions to the second off-going clutch of the second power-on downshift (4-3). The clutch control oil pressure signal 706 controls the second on-coming clutch of the second gearshift.

At the moment 710, when the measured turbine speed starts to increase, the first power-on downshift begins. At the moment 712, the second power-on downshift is requested. At the moment 714, when the measured automatic transmission input shaft rotation speed equals to the automatic transmission input shaft rotation speed estimated at the commanded gear ratio of the first power-on downshift, the first power-on downshift is completed at the first synchronized moment. Also at the moment 714, when the measured automatic transmission input shaft rotation speed continues to increase after the first synchronized moment, the second power-on downshift begins. Therefore, there is no delay between two gearshifts. At the moment 716, when the measured automatic transmission input shaft rotation speed increases to the automatic transmission input shaft rotation speed estimated at the commanded gear ratio of the second power-on downshift, the second synchronized moment occurs. Compared with the two consecutive downshifts shown in FIG. 5, there is no delay between the first gearshift and the second gearshift, which shortens the gearshift duration to a certain extent. Meanwhile, compared to a skip gearshift through a neutral gear, the undesired feeling of a neutral gearshift is avoided. However, this technology only starts the speed regulation of the second gearshift at the synchronized moment of the first gearshift. Therefore, although a delay between the two consecutive gearshifts is avoided, the reduction in gearshift duration and the improvement in vehicle dynamic response are limited.

Figure 8:
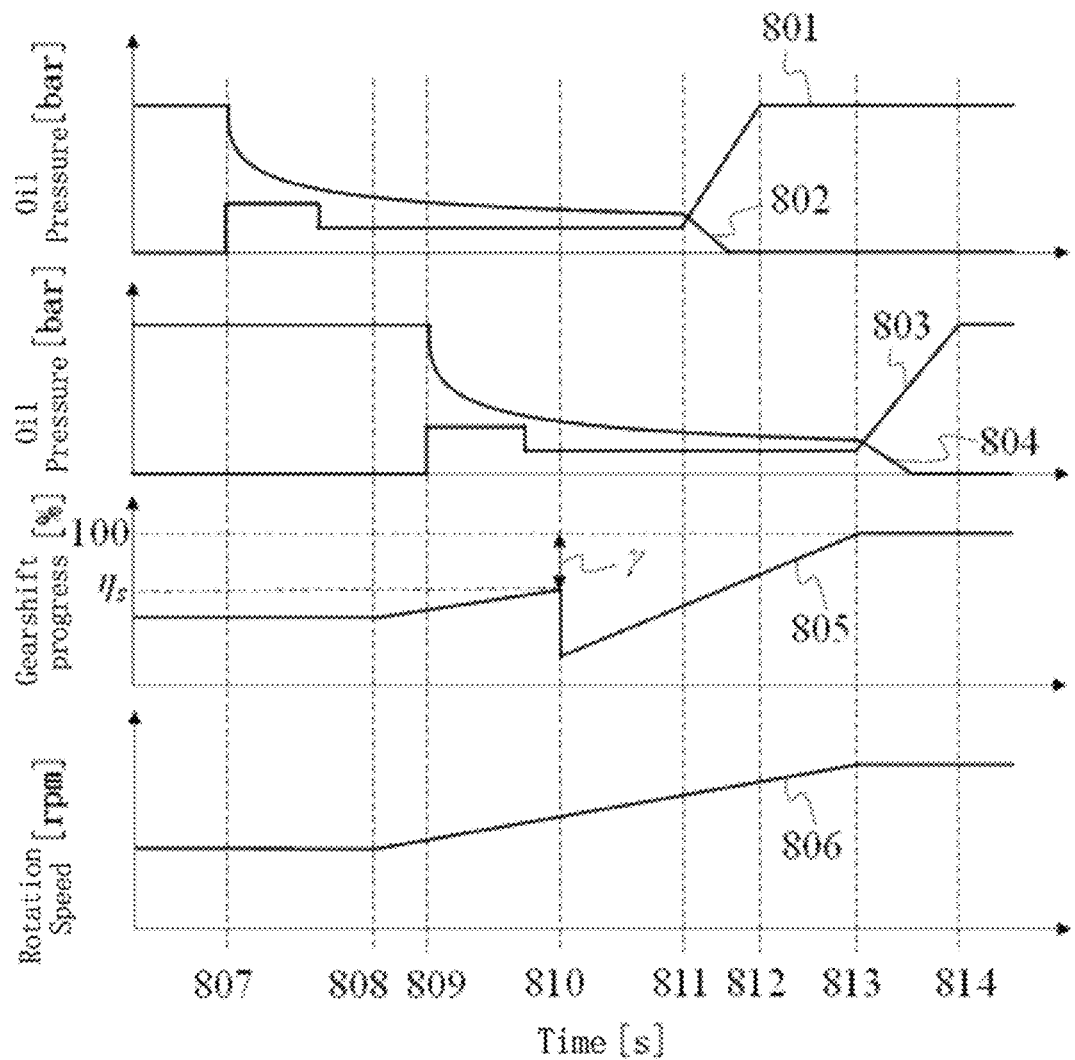
FIG. 8 is a schematic diagram illustrating a variation of control signals and sensor signals when performing a gearshift control on the automatic transmission of the present invention.

To solve the technical problem of the prior art shown in FIGS. 5-7, the present invention provides a gearshift overlap control system and a control method for improving vehicle dynamic response. More specifically, the method and system of the present invention are as follows:

FIG. 8 shows clutch control oil pressure signals, gearshift progress signals and automatic transmission input shaft rotation speed signals for the gearshift overlap control system and control method. The clutch control oil pressure signal 801 controls the first on-coming clutch of the first power-on downshift (8-4), and the clutch control oil pressure signal 802 controls the first off-going clutch of the first power-on downshift (8-4). The clutch control oil pressure signal 803 controls the second on-coming clutch of the second power-on downshift (4-3), and the clutch control oil pressure signal 804 controls the second off-going clutch of the second power-on downshift (4-3).

At the moment 807, the clutch control module initiates the first filling phase. At the moment 808, the clutch control module controls the first off-going clutch pressure to reduce to the minimum oil pressure at which the first off-going clutch does not slip. The clutch control module also controls the first on-coming clutch pressure to reach the first on-coming clutch KP point, wherein the KP point represents a critical oil pressure that the clutches are engaged but do not transmit torque.

Meanwhile, at the moment 808, the clutch control module initiates the first inertia phase, and the gearshift progress 805 starts to increase from 0. When the gearshift progress does not reach $\eta_s$, the clutch control module controls the first off-going clutch based on the feedforward controller and the feedback controller calibrated in a single power-on downshift, and the clutch control module maintains the first on-coming clutch pressure at the first on-coming clutch KP point. When the gearshift progress reaches $\eta_s$, namely, at the moment 810, the second inertia phase starts, resulting in a failure of the feedback controller based on the rotation speed. Subsequently, the clutch control module controls the first off-going clutch based on the feedforward controller calibrated in a single power-on downshift, and the clutch control module maintains the first on-coming clutch pressure at the first on-coming clutch KP point. At the moment 811, when the first inertia phase reaches the calibrated time of the first inertia phase, the first inertia phase ends.

In the meantime, at the moment 811, the clutch control module initiates the first torque phase, and the clutch control module controls the first off-going clutch and the first on-coming clutch based on the feedforward controller calibrated in a single power-on downshift. At the moment 812, the first on-coming clutch reaches the maximum control oil pressure, the first torque phase ends, and then the first on-coming clutch controls the oil pressure to remain at the maximum control oil pressure.

At the moment 809, the clutch control module initiates the second filling phase. When the gearshift progress 805 does not reach $\eta_s$, the clutch control module controls the second off-going clutch pressure to reduce to the minimum oil pressure at which the second off-going clutch does not slip, and the clutch control module controls the second on-coming clutch pressure to reach the second on-coming clutch KP point.

At the moment 810, the clutch control module initiates the second inertia phase, and the clutch control module controls the second off-going clutch based on the feedforward controller calibrated in a single power-on downshift. At this point, the clutch control module maintains the second on-coming clutch pressure at the second on-coming clutch KP point oil pressure. At the moment 813, when the second inertia phase reaches the calibrated time of the second inertia phase, the second inertia phase ends.

Meanwhile, at the moment 813, the clutch control module initiates the second torque phase, and the clutch control module controls the second off-going clutch and the second on-coming clutch based on the feedforward controller calibrated in a single power-on downshift. At the moment 814, the second on-coming clutch reaches the maximum control oil pressure, the second torque phase ends, and then the second on-coming clutch controls the oil pressure to remain at the maximum control oil pressure.

As described above, the speed regulation process of the overlap gearshift is completed from the moment 808 to moment 813. The inertia phase of the first power-on downshift and the inertia phase of the second power-on downshift are overlapped from the moment 810 to the moment 811. Namely, the inertia phase of the second power-on downshift begins before the inertia phase of the first power-on downshift is completed, so that the gearshift duration is shortened and the automatic transmission input shaft rotation speed 806 is allowed to continuously vary. In this way, the delay caused by the consecutive gearshifts shown in FIG. 5 is avoided, and the undesirable feeling of a neutral gearshift in FIG. 6 is avoided. Meanwhile, compared with synchronously performing the second power-on downshift (the second power-on downshift inertia phase) when the first power-on downshift is completed (the first power-on downshift inertia phase is completed) shown in FIG. 7, the gearshift duration is significantly shortened.

As described above, the inertia phase of the first power-on downshift and the inertia phase of the second power-on downshift are overlapped from the moment 810 to the moment 811. Under such circumstances, a closed-loop control based on the rotation speed is no longer applicable. Therefore, the present invention designs an iterative learning control module 1110 in the clutch control module for achieving a downshift overlap control.

In the iterative learning control module 1110, the learning control parameters of the first off-going clutch and the first on-coming clutch are calculated according to the monitored overshoot of the gearshift progress, which is specifically as follows:

$$\begin{cases} \Delta P_{OG}^{j+1} = \Delta P_{OG}^{j} + q_{OG}^{j} \\ \Delta t_{OC}^{j+1} = \Delta t_{OC}^{j} + q_{OC}^{j} \end{cases} \quad (4)$$

wherein $\Delta P_{OG}^{j+1}$ represents an iterative learning control parameter of the first off-going clutch under the $j+1^{th}$ overlap downshift, $\Delta t_{OC}^{j+1}$ represents an iterative control parameter of the first on-coming clutch under the $j+1^{th}$ overlap downshift, $\Delta P_{OG}^{j}$ represents an iterative learning control parameter of the first off-going clutch under the $j^{th}$ overlap downshift, $\Delta t_{OC}^{j}$ represents an iterative control parameter of the first on-coming clutch under the $j^{th}$ overlap downshift, and $q_{OG}^{j}$ and $q_{OC}^{j}$ respectively represent an iterative learning control step length of the first off-going clutch under the $j^{th}$ overlap downshift and an iterative learning control step length of the first on-coming clutch under the $j^{th}$ overlap downshift.

Figure 9:
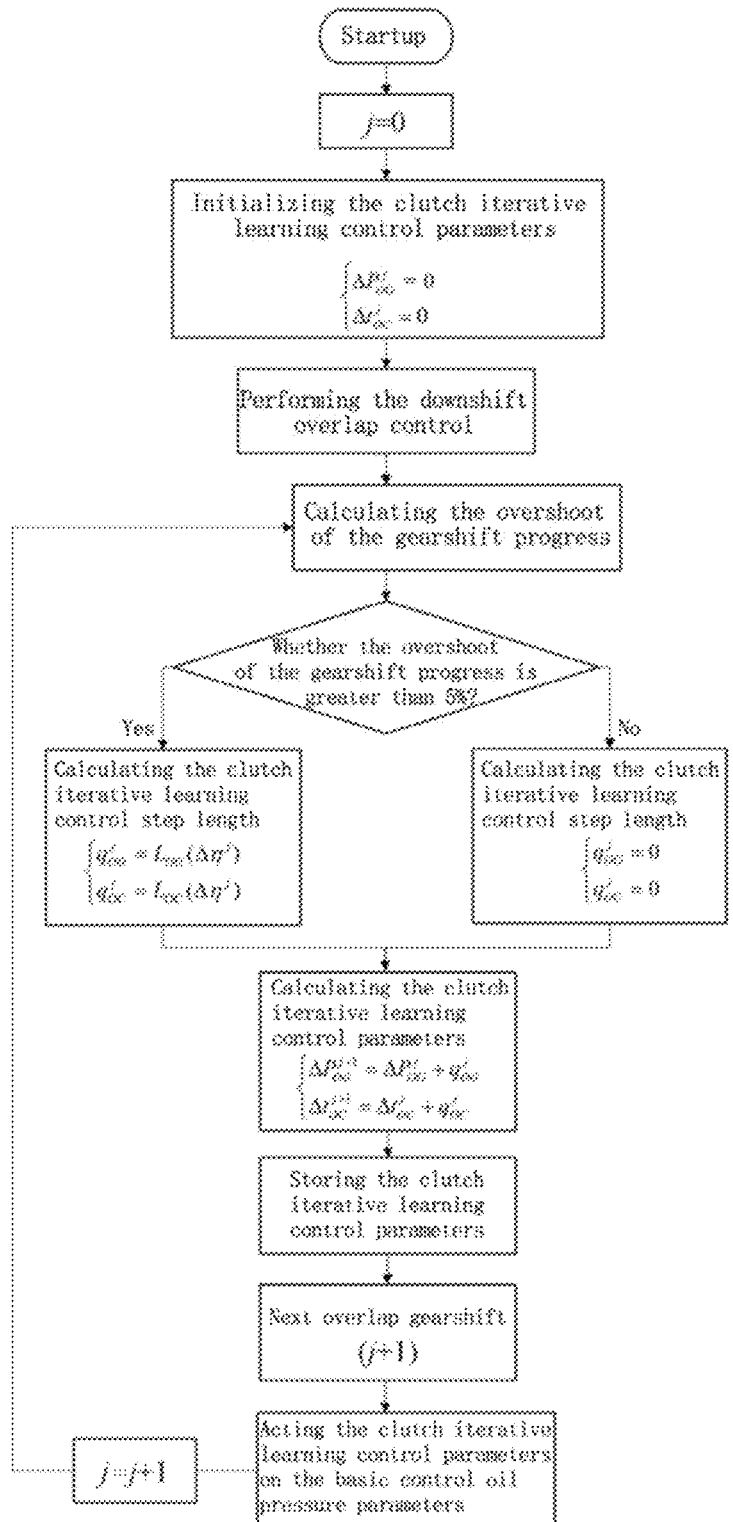
FIG. 9 is a flowchart illustrating the iterative learning control of the present invention.
Figure 10:
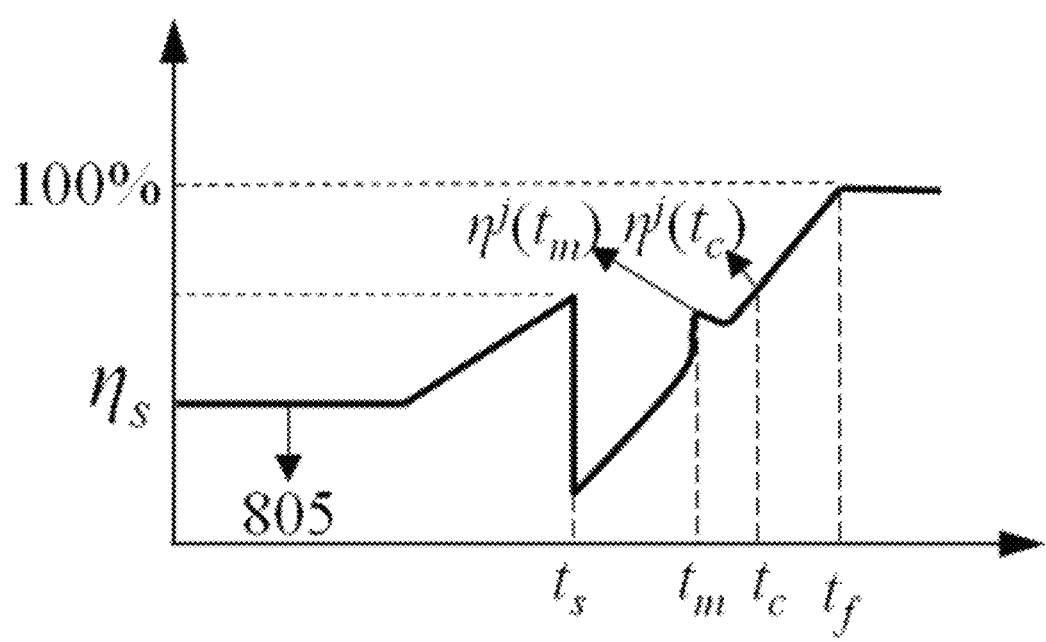
FIG. 10 is a schematic diagram illustrating the calculation of overshoot in a gearshift progress of the present invention.

Referring to FIG. 9, the specific process of the iterative learning control, comprising:

Step 1: referring to FIG. 10, calculating the gearshift progress overshoot $\Delta \eta^{j}$ in the current gearshift process, wherein the iterative learning control module calculates and stores $\eta^{j}(t_c)$ and $\eta^{j}(t_m)$ in real time, and the gearshift progress overshoot is defined as the maximum value of the difference between $\eta^{j}(t_m)$ and $\eta^{j}(t_c)$:

$$\Delta \eta^{j} = \max(\eta^{j}(t_m) - \eta^{j}(t_c)), t_m \in (t_s, t_c], t_c \in (t_s, t_f] \quad (5)$$

wherein $\eta^{j}(t_c)$ represents the value of the gearshift progress corresponding to the current moment $t_c$, $\eta^{j}(t_m)$ represents the maximum value of the gearshift progress between the moment $t_s$ and the moment $t_c$, $t_s$ represents the moment when the second inertia phase is initiated, $t_c$ represents the current moment, $t_m$ represents the moment corresponding to $\eta^{j}(t_m)$, and $t_f$ represents the moment when the second inertia phase ends;

Step 2: determining whether the gearshift progress overshoot $\Delta \eta^{j}$ is greater than the predetermined critical value by 5%;

Step 3: if so, calculating the clutch iterative learning control step length according to formula (6); and if not, calculating the clutch iterative learning control step length according to formula (7);

$$\begin{cases} q_{OC}^{j} = L_{OG}(\Delta \eta^{j}) \\ q_{OC}^{j} = L_{OC}(\Delta \eta^{j}) \end{cases} \quad (6)$$

$$\begin{cases} q_{OC}^{j} = 0 \\ q_{OC}^{j} = 0 \end{cases} \quad (7)$$

wherein $L_{OG}(\Delta \eta^{j})$ and $L_{OC}(\Delta \eta^{j})$ respectively represent an iterative learning control step length of the first off-going clutch and an iterative learning control step length of the first on-coming clutch obtained according to the gearshift progress overshoot of the $j^{th}$ overlap downshift by using a look-up table method;

Step 4: calculating the iterative learning control parameters $\Delta P_{OG}^{j+1}$ and $\Delta t_{OC}^{j+1}$ of the first off-going clutch and the first on-coming clutch according to formula (8);

$$\begin{cases} \Delta P_{OG}^{j+1} = \Delta P_{OG}^{j} + q_{OG}^{j} \\ \Delta t_{OC}^{j+1} = \Delta t_{OC}^{j} + q_{OC}^{j} \end{cases} \quad (8)$$

Step 5: storing the iterative learning control parameters $\Delta P_{OG}^{j+1}$ and $\Delta t_{OC}^{j+1}$ of the first off-going clutch and the first on-coming clutch;

Step 6: performing the $j+1^{th}$ overlap downshift of the vehicle in the same working condition;

Step 7: acting the clutch iterative learning control parameters on the basic control parameters, wherein the basic control parameters refers to the feedforward control parameters and the feedback control parameters of the first and second off-going clutches as well as the first and second on-coming clutches in the overlap gearshift, which have been calibrated in a single gearshift (8-4 and 4-3).

The above are merely preferred embodiments of the present invention, and there may be combinations of different configurations and feature parameters. The embodiments of the present invention merely show exemplary parameters and are not intended to limit the present invention. For those skilled in the art, the present invention may have various modifications and variations. Therefore, any modifications, equivalent replacements and improvement made within the spirit and principles of the present invention shall fall into the scope defined by the claims of the present invention.

What is claimed is:

1. A gearshift overlap control system for improving vehicle dynamic response, wherein the control system performs a gearshift overlap control based on iterative learning, wherein the control system comprising:

a gearshift progress calculation module: the gearshift progress calculation module is capable of calculating a gearshift progress in real time;

a clutch control module: the clutch control module is capable of executing a first power-on downshift control and starting to control a second power-on downshift clutch when the gearshift progress reaches a preset gearshift progress at which a second power-on downshift is requested;

an iterative learning control module: the iterative learning control module is capable of automatically adjusting a first on-coming clutch control pressure and a first off-going clutch control pressure in a first power-on downshift by means of monitoring an overshoot of the gearshift progress, thereby reducing the overshoot of the gearshift progress, wherein in the gearshift progress calculation module, a calculation method of the gearshift progress is as follows:

$$\eta = 100\% \cdot \frac{(i_c - i)}{(i_c - i_t)} \quad (1)$$

wherein $\eta$ represents the gearshift progress, $i_c$ represents a speed ratio of a current gear, $i_t$ represents a speed ratio of a target gear, and i represents a ratio of a rotation speed of an input shaft to a rotation speed of an output shaft of a transmission, wherein a calculation formula is as follows:

$$i = \frac{\omega_1}{\omega_2} \quad (2)$$

wherein $\omega_1$ represents the transmission input shaft rotation speed, and $\omega_2$ represents the transmission output shaft rotation speed, wherein based on the gearshift progress, defining a gearshift overlap factor $\gamma$:

$$\gamma = 100\% - \eta_s \quad (3)$$

wherein $\eta_s$ represents a corresponding gearshift progress when the second power-on downshift is requested, wherein in the clutch control module, after the first power-on downshift is completed, the second power-on downshift is controlled based on the corresponding gearshift progress $\eta_s$ when the second power-on downshift is triggered, wherein the first power-on downshift process further comprises:
a first filling phase, a first inertia phase and a first torque phase,
wherein the second power-on downshift process further comprises:
a second filling phase, a second inertia phase and a second torque phase, wherein in the first filling phase, the clutch control module controls the first off-going clutch control pressure to reduce to a minimum oil pressure at which a first off-going clutch does not slip, and the clutch control module controls the first on-coming clutch control pressure to reach a first on-coming clutch KP point, wherein the KP point represents a critical point oil pressure that the clutches are engaged but do not transmit torque, wherein in the first inertia phase, the gearshift progress starts to increase from 0, wherein when the gearshift progress does not reach $\eta_s$, the clutch control module controls the first off-going clutch based on a feedforward controller and a feedback controller calibrated in a single power-on downshift, and the clutch control module maintains the first on-coming clutch control pressure at a first on-coming clutch KP point oil pressure, wherein when the gearshift progress reaches $\eta_s$, the second inertia phase is triggered, resulting in a failure of the feedback controller based on the rotation speed of the input shaft, wherein subsequently, the clutch control module controls the first off-going clutch based on the feedforward controller calibrated in a single power-on downshift, and the clutch control module maintains the first on-coming clutch control pressure at the first on-coming clutch KP point, wherein when the first inertia phase reaches a calibrated time of the first inertia phase, the first inertia phase ends, and the first torque phase starts, wherein in the first torque phase, the clutch control module controls the first off-going clutch and the first on-coming clutch based on the feedforward controller calibrated in a single power-on downshift, wherein after the first inertia phase starts, and before the gearshift progress reaches $\eta_s$, the second filling phase starts, wherein in the second filling phase, when the gearshift progress does not reach $\eta_s$, the clutch control module controls a second off-going clutch pressure to reduce to a minimum oil pressure at which the second off-going clutch does not slip, and the clutch control module controls a second on-coming clutch pressure to reach a second on-coming clutch KP point, wherein when the gearshift progress reaches $\eta_s$, the second inertia phase starts, wherein in the second inertia phase, the clutch control module controls the second off-going clutch based on the feedforward controller calibrated in a single power-on downshift, and the clutch control module maintains the second on-coming clutch pressure at the second on-coming clutch KP point, wherein when the second inertia phase reaches a calibrated time of the second inertia phase, the second inertia phase ends, and meanwhile, the second torque phase starts, wherein in the second torque phase, the clutch control module controls the second off-going clutch and the second on-coming clutch based on the feedforward controller calibrated in a single power-on downshift, wherein in the iterative learning control module, learning control parameters of the first off-going clutch and the first on-coming clutch are calculated according to the monitored overshoot of the gearshift progress, which is specifically as follows:

$$\begin{cases} \Delta P_{OG}^{j+1} = \Delta P_{OG}^{j} + q_{OG}^{j} \\ \Delta t_{OC}^{j+1} = \Delta t_{OC}^{j} + q_{OC}^{j} \end{cases} \quad (4)$$

wherein $\Delta P_{OG}^{j+1}$ represents an iterative learning control parameter of the first off-going clutch under aj+$1^{th}$ overlap downshift, $\Delta t_{OC}^{j+1}$ represents an iterative control parameter of the first on-coming clutch under the j+$1^{th}$ overlap downshift, $\Delta P_{OG}^{j}$ represents an iterative learning control parameter of the first off-going clutch under the $j^{th}$ overlap downshift, $\Delta t_{OC}^{j}$ represents an iterative control parameter of the first on-coming clutch under the $j^{th}$ overlap downshift, and $q_{OG}^{j}$ and $q_{OC}^{j}$ respectively represent an iterative learning control step length of the first off-going clutch under the $j^{th}$ overlap downshift and an iterative learning control step length of the first on-coming clutch under the $j^{th}$ overlap downshift, wherein in the iterative learning control module, a specific process of the iterative learning control, comprising:
step 1: calculating the gearshift progress overshoot $\Delta \eta^j$ in a current gearshift progress, wherein the iterative learning control module calculates and stores $\eta^j(t_c)$ and $\eta^j(t_m)$ in real time, and the gearshift progress overshoot is defined as a maximum value of a difference between $\eta^j(t_m)$ and $\eta^j(t_c)$:

$$\Delta \eta^j = \max(\eta^j(t_m) - \eta^j(t_c)), \, t_m \in (t_s, t_c], \, t_c \in (t_s, t_f] \quad (5)$$

wherein $\eta^j(t_c)$ represents a value of the gearshift progress corresponding to a current moment $t_c$, $\eta^j(t_m)$ represents a maximum value of the gearshift progress between a moment $t_s$ and the moment $t_c$, $t_s$ represents a moment when the second inertia phase is initiated, $t_c$ represents the current moment, $t_m$ represents a moment corresponding to $\eta^j(t_m)$, and $t_f$ represents a moment when the second inertia phase ends;

step 2: determining whether the gearshift progress overshoot $\Delta\eta^j$ is greater than a predetermined critical value by 5%;

step 3: if so, calculating the clutch iterative learning control step length according to formula (6); and if not, calculating the clutch iterative learning control step length according to formula (7);

$$\begin{cases} q_{OC}^j = L_{OG}(\Delta\eta^j) \\ q_{OC}^j = L_{OC}(\Delta\eta^j) \end{cases} \quad (6)$$

$$\begin{cases} q_{OC}^j = 0 \\ q_{OC}^j = 0 \end{cases} \quad (7)$$

wherein $L_{OG}(\Delta\eta^j)$ and $L_{OC}(\Delta\eta^j)$ respectively represent an iterative learning control step length of the first off-going clutch and an iterative learning control step length of the first on-coming clutch obtained according to the gearshift progress overshoot of the $j^{th}$ overlap downshift by using a look-up table method;

step 4: calculating the iterative learning control parameters $\Delta P_{OG}^{j+1}$ and $\Delta t_{OC}^{j+1}$ of the first off-going clutch and the first on-coming clutch according to formula (8);

$$\begin{cases} \Delta P_{OG}^{j+1} = \Delta P_{OG}^j + q_{OG}^j \\ \Delta t_{OC}^{j+1} = \Delta t_{OC}^j + q_{OC}^j \end{cases} \quad (8)$$

Step 5: storing the iterative learning control parameters $\Delta P_{OG}^{j+1}$ and $\Delta t_{OC}^{j+1}$ of the first off-going clutch and the first on-coming clutch;

Step 6: performing the j+1$^{th}$ overlap downshift of the vehicle in a same working condition;

Step 7: acting the clutch iterative learning control parameters $\Delta P_{OG}^{j+1}$ and $\Delta t_{OC}^{j+1}$ on basic clutch control parameters of the first power-on downshift.

2. A gearshift overlap control method for improving vehicle dynamic response, wherein the control method achieves a gearshift overlap control based on iterative learning, wherein the gearshift overlap control method for improving vehicle dynamic response, comprising the steps of:

step 1: calculating a gearshift progress of a first power-on downshift by a gearshift progress calculation module;

step 2: completing the first power-on downshift and starting to control a second power-on downshift clutch when a set gearshift progress is reached and a second power-on downshift is requested;

step 3: calculating an iterative learning control parameter of a first on-coming clutch and an iterative learning control parameter of a first off-going clutch by monitoring an overshoot of the gearshift progress, and automatically adjusting the first on-coming clutch control parameter and the first off-going clutch control parameter of the first power-on downshift when the gearshift overlap control is triggered in a same working condition in a next time by an iterative learning control module, thereby reducing the overshoot of the gearshift progress.

* * * * *